United States Patent [19]
Fukushi

[11] Patent Number: 5,793,250
[45] Date of Patent: Aug. 11, 1998

[54] PHASE DEMODULATOR SELECTIVELY USING A FIRST OR A SECOND DETECTOR

[75] Inventor: Mikio Fukushi, Tokyo, Japan

[73] Assignee: NEC Corporation, Tokyo, Japan

[21] Appl. No.: 733,120

[22] Filed: Oct. 16, 1996

[30] Foreign Application Priority Data

Oct. 16, 1995 [JP] Japan ................. 7-267189

[51] Int. Cl.$^6$ ................................. H04L 27/227
[52] U.S. Cl. .............. 329/307; 329/346; 375/327; 375/329
[58] Field of Search ................... 329/304, 307, 329/346; 375/327, 329

[56] References Cited

U.S. PATENT DOCUMENTS 5,440,587  8/1995  Ishikawa et al. ............ 329/304
5,533,060  7/1996  Kameo et al. ............... 329/304

FOREIGN PATENT DOCUMENTS 63-193626  8/1988  Japan .

Primary Examiner—Siegfried H. Grimm
Attorney, Agent, or Firm—Ostrolenk, Faber, Gerb & Soffen, LLP

[57] ABSTRACT

A demodulator for radio data communications is provided, which is capable of an optimum demodulation operation in response to the environmental condition under which communications are made independent of the preamble length. A phase angle calculator calculates a phase angle of the input signal. A frequency offset calculator calculates an offset of a carrier frequency of the input signal. A PLL generates a compensated phase angle of the input signal to compensate the frequency offset. A first detector detects the input signal using the uncompensated phase angle to generate a first detected signal. A second detector detects the input signal using the compensated phase angle to generate a second detected signal. A first phase distortion calculator calculates a phase distortion of the first detected signal. A second phase distortion calculator calculates a phase distortion of the second detected signal. A phase distortion comparator compares the phase distortions of the first and second detected signals to generate a result signal. A selector selects an output from one of the first and second detectors according to the result signal.

7 Claims, 4 Drawing Sheets

PHASE DEMODULATOR SELECTIVELY USING A FIRST OR A SECOND DETECTOR

BACKGROUND OF THE INVENTION

1. Field of the Invention

The present invention relates to a demodulator for radio data communications and more particularly, to a demodulator applicable to radio Local Area Network (LAN) communications.

2. Description of the Prior Art

Phase Shift Keying (PSK) has been frequently employed as the modulation method in the multi-directional communication systems operated in the burst mode. In the communication systems of this sort, deflection of the carrier frequency, (i.e., the carrier frequency offset) leads to PSK demodulation distortion, giving a serious effect on their error rate characteristic.

Therefore, in order to automatically compensate the phase rotation amount due to the carrier frequency offset, for example, a phase-locked loop (PLL) type coherent detector has been developed. With the conventional PLL-type coherent detector, the carrier wave is regenerated on the receiver side and the phase of an input signal wave is compared with that of the regenerated carrier wave, thereby automatically following the oscillation frequency of a coherent oscillator to the frequency of the input signal wave.

It is said that the conventional coherent detector is more preferable in signal-to-noise ratio (S/N) and bit error rate than the differential detectors. However, the above conventional coherent detector has a problem that the input signal wave may be unable to be demodulated when the data transmitted by the input signal wave has a frame format whose preamble length is comparatively long.

Specifically, when the conventional coherent detector is intended to operate up to the second-order loop of the PLL circuit, at least several tens symbols need to be processed within the lock-up time of the PLL circuit. The "lock-up time" is defined as a time from the start of phase lock operation to the finish thereof.

For the frame format having a comparatively long preamble length, if any other process is performed during the receipt of the preamble, the phase lock operation of the PLL circuit cannot be finished and as a result, the received data may not be completely demodulated by means of the coherent detection.

A conventional phase synchronizing circuit was disclosed in the Japanese Unexamined Patent Publication No. 63-193626 published in August 1988, in which the lock-up time of a digital PLL circuit is shortened to thereby solve the above problem.

In the conventional phase synchronizing circuit, compensation pulses, the number of which is adjusted according to the phase difference between a received data signal and a reference clock signal, are inputted into a phase-difference counter at each rise and fall of the received data signal. The delay of the reference clock signal is controlled by the output of the phase-difference counter. As a result, the lock-up time of the PLL circuit is decreased.

FIG. 1 shows the conventional phase synchronizing circuit disclosed in the Publication No. 63-193626.

In FIG. 1, a data signal A is received through a data input terminal 41. An oscillator 44 generates a reference clock signal B. The received data signal A and the reference clock signal B from the oscillator 44 are inputted into an edge detector 45. The edge detector 45 detects the rise and fall of the received data signal A and outputs an edge detection pulse D synchronized with each rise and fall. The pulse D is inputted into a phase discriminator 46. On the other hand, a phase compensation clock signal C for the demodulation use also is inputted into the phase discriminator 46.

In the phase discriminator 46, the phase compensation clock signal C and the edge detection pulse D are compared with each other.

If the edge detection pulse D is inputted when the phase compensation clock signal C is at the low level, the phase discrimination is made such that a phase compensation clock signal C (which will be explained later) is delayed with respect to the received data signal A. As a result, the phase discriminator 46 outputs a signal E in the low level.

If the edge detection pulse D is inputted when the phase compensation clock signal C is at the high level, the phase discrimination is made such that the phase compensation clock signal C is led or advanced with respect to the received data signal A. As a result, the phase discriminator 46 outputs the signal E in the high level.

In other words, if the phase compensation clock signal C is delayed with respect to the data signal A, the output signal E of the phase discriminator 46 is in the low level, and if signal C is led with respect to the signal A, the output signal E is in the high level.

The output signal E of the phase discriminator 46 is inputted into a phase-difference pulse generator 47 and a phase difference counter 48, respectively.

The phase-difference pulse generator 47 outputs a pulse G in response to the phase difference between the clock signal C and the edge detection pulse D. The pulse G is called a "phase-difference clock signal". The pulse G is sent to a phase difference counter 48 as its clock signal.

The output signal E of the phase discriminator 46 is used for up- or down-counting the phase difference counter 48. When the clock signal C is delayed with respect to the data signal A, the counter 48 is counted down, and when advanced, it is counted up. This counting operation is repetitively carried out whenever the edge detection pulse D is generated.

The output signal of the phase difference counter 48 is used for loading a shift register 52 serving as a delay circuit.

On the other hand, the reference clock signal B from the oscillator 44 is frequency-divided by a frequency divider 51 and is sent to the shift register 52. The signal B is phase-delayed by the shift resistor 52 for the purpose of phase compensation.

As described above, if the phase compensation clock signal C is delayed in phase with respect to the data signal A, the value of phase delay is decreased. On the other hand, if the clock signal C is advanced with respect to the data signal A, the value of phase delay is increased.

This operation is repetitively performed at each edge-detection timing of the received data signal A and therefore, the phase compensation behavior can be carried out without delay in time.

The phase compensation clock signal C thus obtained is then frequency-divided by a frequency divider 53 into a wanted frequency, resulting in a renewed clock signal C'. The signal C' is sent to a polarity judge circuit 54.

The received data signal A is inputted into the polarity judge circuit 54. The renewed clock signal C' is mixed with the signal A to be inputted into a demodulator 55.

The data signal A is demodulated by the demodulator 55 to thereby generate a demodulated data signal A'. The demodulated data signal A' and the renewed clock signal C' are sent to a waveform shaper 56 to shape their waveforms and then, they are outputted from a demodulated data output terminal 42 and a renewed clock signal output terminal 43, respectively.

With the conventional phase-synchronizing circuit shown in FIG. 1, since the phase of the phase compensation clock C is quickly synchronized with the received data signal A, the lock-up time of the PLL circuit can be decreased. However, the following problems occur.

First, to reduce the lock-up time of the digital PLL, an up-down counter or an edge detection circuit is required additionally to the basic structure for the coherent detection. As a result, the circuit may be complex in structure.

Second, it is not always ensured that the digital PLL is phase-locked under an inferior fading environmental condition.

Third, the necessary starting processes (for example, automatic gain control (AGC), antenna selection by means of diversity, synchronous clock sampling) are performed while receiving the preamble of the transmitted signal. The operation of the digital PLL circuit is commenced after the starting processes are completed. In the case where the preamble length of the data format is fixed long, the PLL circuit may be unable to finish its phase-locking operation during the receipt of the preamble. This means that the received data signal may not be completely demodulated by means of the coherent detection method.

SUMMARY OF THE INVENTION

Accordingly, an object of the present invention is to provide a demodulator for radio data communications which is able to perform an optimum demodulation operation in response to the environmental condition under which communications are made.

Another object of the present invention is to provide a demodulator for radio data communications which is capable of good demodulation operation with a simple circuit structure.

A further object of the present invention is to provide a demodulator for radio data communications which is capable of good demodulation operation independent of the preamble length.

The above objects together with others not specifically mentioned will become clear to those skilled in the art from the following description.

A demodulator according to the present invention is for demodulating a received input signal which has been subjected to phase modulation and which has been transmitted from the transmitting side. A frame format of the input signal includes a preamble and data.

The demodulator is comprised of a phase angle calculator for calculating a phase angle of the input signal; a frequency offset calculator for calculating an offset of a carrier frequency of the input signal; a PLL for generating a compensated phase angle of the input signal, the compensated phase angle compensating the frequency offset; a first detector for detecting the input signal using the uncompensated phase angle to generate a first detected signal; a second detector for detecting the input signal using the compensated phase angle to generate a second detected signal; a first phase distortion calculator for calculating a phase distortion of the first detected signal; a second phase distortion calculator for calculating a phase distortion of the second detected signal; a phase distortion comparator for comparing the phase distortions of the first and second detected signals to generate a result signal; and a selector for selecting an output from one of said first and second detectors according to the result signal.

With the demodulator according to the present invention, the phase distortion comparator compares the phase distortions of the first and second detected signals and generates the result signal. The detection mode selector selects an output from one of the first and second detectors according to the result signal.

Therefore, by selecting the output from one of the first and second detectors whose phase distortion is relatively low, an optimum demodulation operation can be performed in response to the environmental condition under which communications are made.

Also, even if the lock-up operation of the PLL is not completed and therefore, the compensated phase angle is not obtained during the receipt of the preamble, a demodulation operation can be carried out by using the first detector. After the lock-up operation of the PLL is completed, a demodulation operation can be selectively performed by one of the first and second detectors using the compensated phase angle.

As a result, a good demodulation operation can be performed independent of the preamble length.

Further, since no additional circuit such as an up-down counter, an edge detection circuit, or the like is required to the basic structure for the coherent detection, a good demodulation operation can be realized with a simple circuit structure.

In a preferred embodiment of the invention, the input signal contains quadrature components. A/D converters are additionally provided for A/D-converting the quadrature components, respectively. The phase angle calculator calculates a phase angle between the components.

In another preferred embodiment of the invention, each of the first and second detectors performs differential detection with respect to the values of the phase angle at adjacent two symbol timings.

BRIEF DESCRIPTION OF THE DRAWINGS

In order that the invention may be readily carried into effect, it will now be described with reference to the accompanying drawings.

DETAILED DESCRIPTION OF THE PREFERRED EMBODIMENTS

Figure 1:
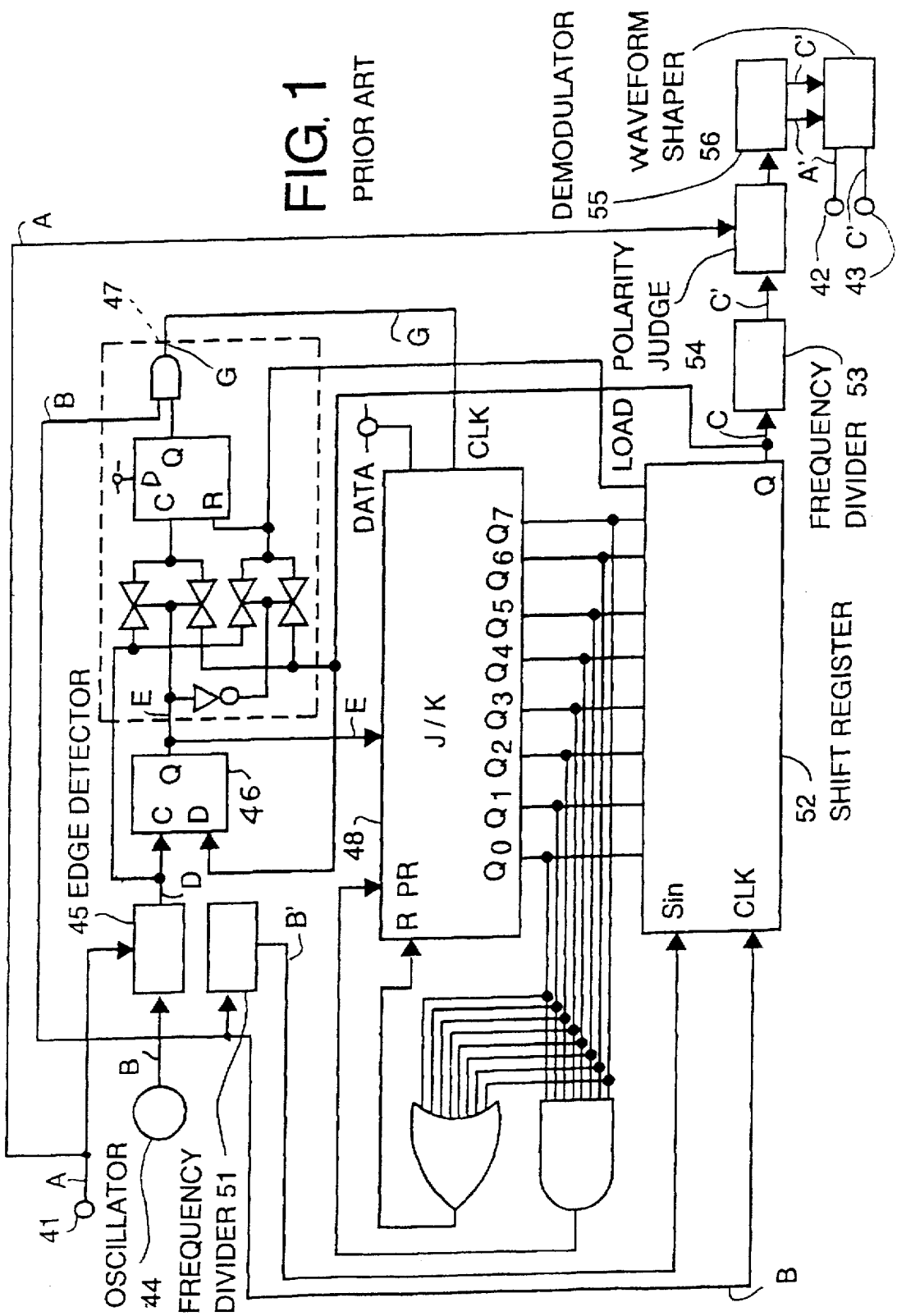
FIG. 1 is a block diagram of a conventional phase synchronizing circuit.

A preferred embodiment of this invention will be described below by referring to the drawings.

Figure 2:
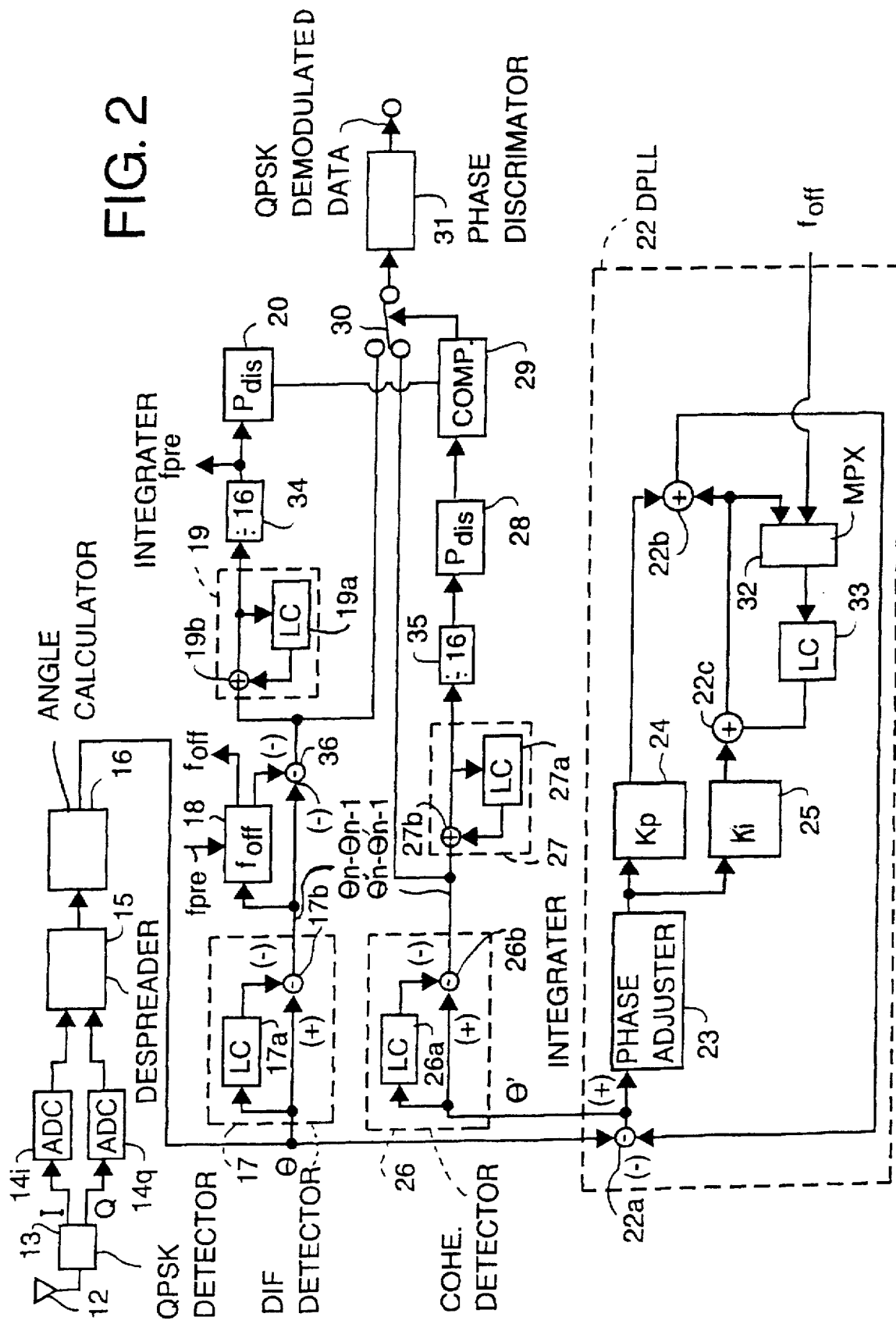
FIG. 2 is a block diagram of a SS radio receiver as a demodulator of radio data communications according to an embodiment of the present invention.

In FIG. 2, a radio receiver including a demodulator according to an embodiment of the present invention is shown. The receiver is designed for the Spread Spectrum (SS) communication system in conformity with Institute of Electrical and Electronic Engineers (IEEE) Project 802.11.

Figure 3:
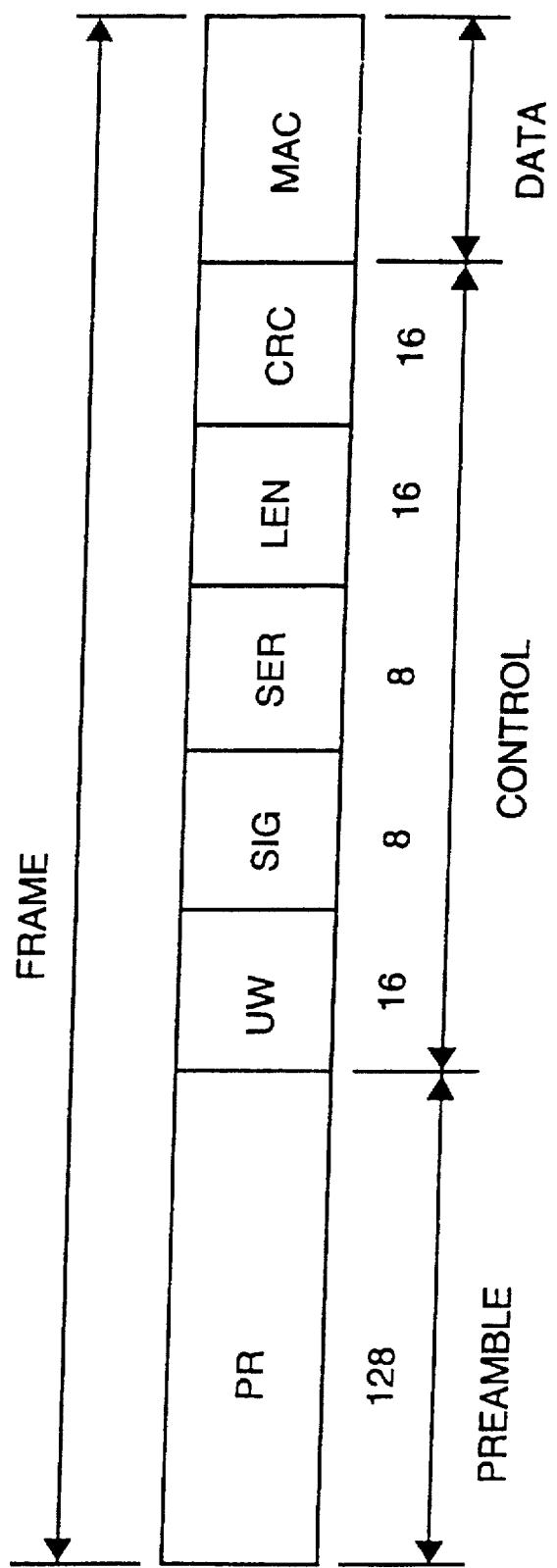
FIG. 3 is a diagram showing the frame format of the SS radio receiver shown in FIG. 2.

A transmission frame of an input data has a format as shown in FIG. 3, which includes a preamble region, a control region, and a data region. Specifically, a preamble PR of 128 bits is set in the preamble region. The preamble region is followed by the control region. The control region includes a unique word UW of 16 bits, a signal bit SIG of 8 bits, a service bit SER of 8 bits, a length bit LEN of 16 bits, and a Cyclic Redundancy Check bit CRC of 16 bits. The control region is followed by the data region. The data region includes a MAC data bit having a length defined by the length bit LEN.

The SS radio receiver shown in FIG. 1 receives the radio input signal subjected to the spread spectrum transmission by a SS transmitter (not shown). In this transmitter, a data to be transmitted as the radio input signal is differentially modulated with respect to adjacent two symbol timings, thereby generating two quadrature components. These components are then SS modulated. Thus, a Quadrature Phase Shift Keying (QPSK) output is generated. The QPSK output contains four components whose phases are apart by 90°.

The QPSK output is received by an antenna 12 as the input radio signal. The input signal thus received is subjected to a two-phase quadrature demodulation by a QPSK detector 13, thereby generating an I component (in-phase component) and a Q component (quadrature component).

The I and Q components are inputted into corresponding A/D converters 14$i$ and 14$q$ to be analog-to-digital (A/D) converted, respectively. The A/D-converted I and Q components are sent to a despreader 15, generating a despreaded data signal.

The despreaded data signal is sent to an angle calculator 16 to calculate an angle $\theta$ between the I and Q components, where the calculation of $\theta$ is carried out as $\theta=\tan^{-1}(Q/I)$ for each symbol timing. The calculation is supposed to be made at an accuracy of K bits, where K is a positive constant. Here K=6. The value of angle $\theta$ for each symbol thus obtained is sent to a differential detector 17 for the purpose of coherent detection.

The differential detector (or first detector) 17 includes a latch circuit 17$a$ in which the value of $\theta$ at each bit is latched, and a subtracter 17$b$. The detector 17 performs a differential detection operation for the values of $\theta$. In other words, the detector 17 calculates the phase angle difference $(\theta_n-\theta_{n-1})$ between the n-th and (n−1)-th symbol timings using the latch circuit 17$a$, where n is a natural number greater than unity.

Since the phase angle difference value $(\theta_n-\theta_{n-1})$ thus obtained indicates a frequency offset or frequency error $f_{off}$, the value of $f_{off}$ is held in a frequency offset holder 18. The frequency offset value of $f_{off}$ is obtained at each pair of adjacent two symbols.

The value of $f_{off}$ enables the Automatic Frequency Control (AFC) operation by subtracting the difference value for the (n−1)-th timing held in the holder 18 from the difference value for the n-th timing.

The value of $f_{off}$ is sent to a first-order loop of the digital PLL circuit 22 for the purpose of coherent detection. The frequency offset value makes it possible to reduce the lock-up time of the PLL 22.

The phase angle difference value $(\theta_n-\theta_{n-1})$ is further subtracted by the offset frequency $f_{off}$ in a subtracter 36.

A difference integrator 19 has a latch circuit 19$a$ and an adder 19$b$, in which the values of $(\theta_n-\theta_{n-1})$ are integrated over the symbol intervals of S, resulting in an integrated value of the angle difference.

Here, the symbol interval S is set as 16.

The integrated value of the angle difference is then divided by S by a divider 34, resulting in an average value of the frequency offset $f_{off}$ as a phase distortion value of the differential detection. This phase distortion value is then held in a phase distortion holder 20 and is sent to a phase distortion comparator 29.

The phase distortion value is fed back to the holder 18 as a preset value $f_{pre}$. The values of $(\theta_n-\theta_{n-1})$ are further sent to a switch 30, also.

The value of the frequency offset $f_{off}$ held by the frequency offset holder 18 is loaded to the second-order loop of the digital PLL circuit 22. Since this loading operation is made by a simple switching, it can be realized by a multiplexer 32 located in the PLL circuit 22. After loading of $f_{off}$ the PLL circuit 22 starts to operate.

Next, a brief explanation will be made on the operation of the PLL circuit 22.

A phase adjuster 23 serves to adjust the number of bits to be followed within the first- and second-order loops. The adjuster 23 selects four lower bits of the 6 bits of the angle value, which is obtained by the angle calculator 16 for QPSK, and selects five lower bits of them for Binary PSK (BPSK).

A filter 24 has a coefficient of $K_p$ and a filter 25 has a coefficient of $K_i$, both of which are well-known ones. The two filters 24 and 25 are connected to the second-order loop of the PLL circuit 22. The followability of this loop will be varied depending upon these coefficients $K_p$ and $K_i$.

The multiplexer 32 and a latch circuit 33 are provided for multiplexing the values of the frequency offset for each symbol sent from the frequency offset holder 18 to the PLL circuit 22.

The first-order loop includes a subtracter 22$a$, the phase adjuster 23, the filter 24, and an adder 22$b$. The second-order loop includes the subtracter 22$a$, the phase adjuster 23, the filters 24 and 25, an adder 22$c$, and the adder 22$b$.

The digital PLL circuit 22 is kept operating during the demodulation simultaneously with the start of the differential demodulation operation by the detector 17.

The PLL circuit 22 receives the angle value of $\theta$ calculated by the angle calculator 16, and outputs a compensated angle value of $\theta'$ which is obtained considering the inputted value of $f_{off}$ from the frequency offset holder 18.

A coherent, differential detector (or second detector) 26 has a latch circuit 26$a$ in which the value of $\theta'$ at each symbol is latched, and a subtracter 26$b$. The detector 26 performs a differential detection operation for the compensated value of $\theta'$ outputted by the PLL circuit 22. In other words, the detector 26 calculates the angle difference $(\theta_n'-\theta_{n-1}')$ between the n-th symbol and the (n−1)-th symbol.

A difference integrator 27 has a latch circuit 27$a$ in which the value of the frequency offset $f_{off}$ at each pair of adjacent two symbols is latched, and an adder 27$b$. The integrator 27 integrates the difference values of the output of the differential detector 26 over the symbol intervals of S, resulting in an integrated value of the angle difference.

The integrated value of the angle difference $(\theta_n'-\theta_{n-1}')$ is then divided by S by a divider 35, resulting in an average value of the phase offset $p_{off}$ as a phase distortion value of the coherent, differential detection. The values of $(\theta_n'-\theta_{n-1}')$ are further sent to the switch 30, also.

The phase distortion value of the coherent, differential detection is then held in a phase distortion holder 28 and sent to the phase distortion comparator 29.

The phase distortion comparator 29 compares the phase distortion value in the differential detection and that in the coherent, differential detection. The comparator 29 outputs a result signal of the comparison to drive the switch 30,thereby selecting one of the differential detection and the coherent, differential detection in accordance with the result obtained through the comparison. Specifically, one of the two detection methods which has the relatively smaller phase distortion than another is selected.

The selected value of the angle difference $(\theta_n-\theta_{n-1})$ or $(\theta_n'-\theta_{n-1}')$ is inputted into a phase discriminator 31 to discriminate the phase of the angle value. Thus, a QPSK demodulated data is outputted from the discriminator 31.

Next, the operation of the SS radio receiver shown in FIG. 1 is explained below.

Figure 4:
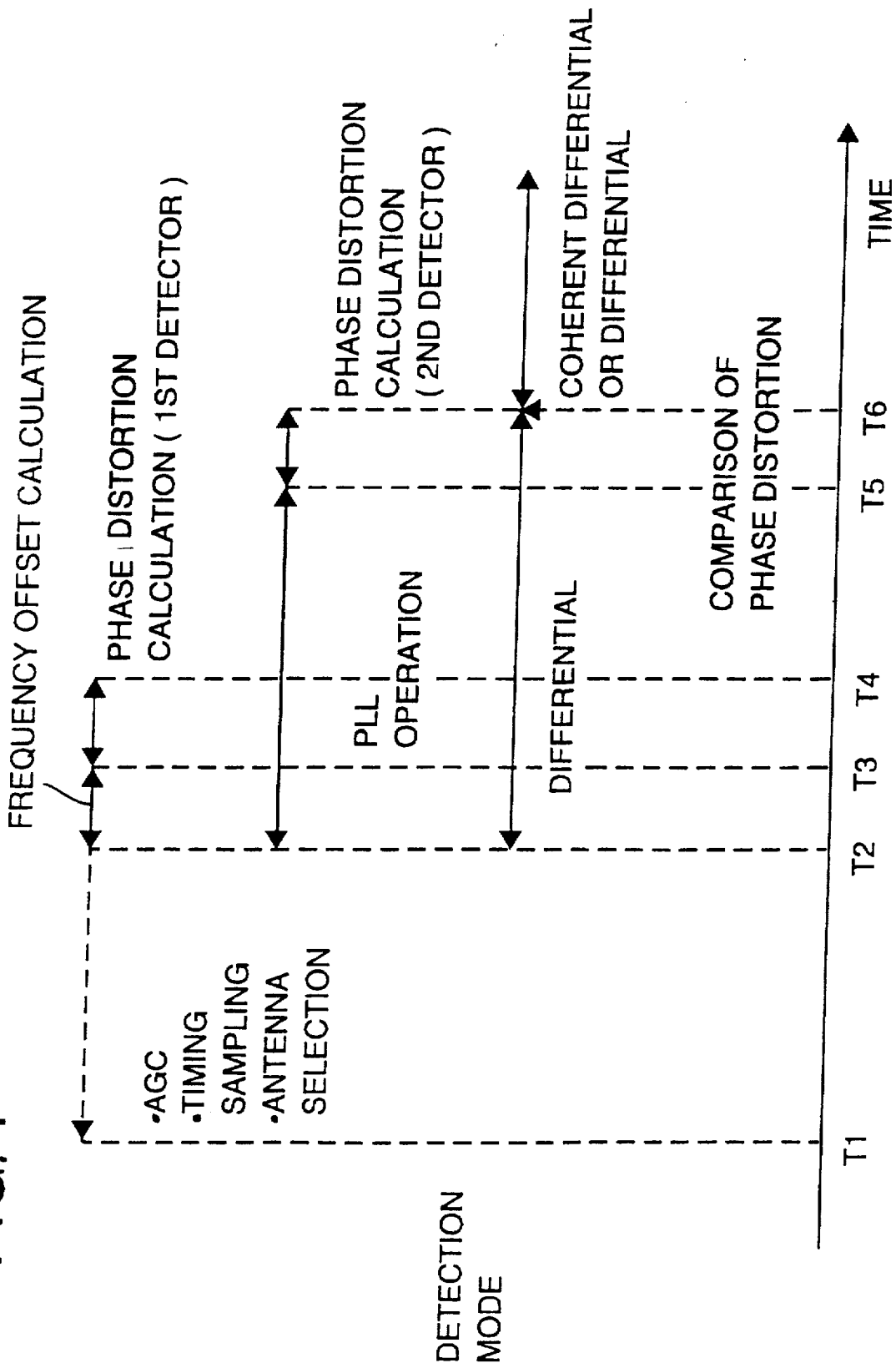
FIG. 4 is a diagram showing a sequence of the receiving operation of the SS radio receiver shown in FIG. 2.

As seen in the receiving sequence shown in FIG. 4, at the time T1 when the receiving operation of the preamble is started, the SS receiver starts to perform the necessary starting operations such as AGC, timing sampling, monitoring of the received signal level, switching of the antenna 12, and then, it performs the antenna diversity. Thus, the antenna 12 is selected in response to the receiving signal level and the optimum data sampling timing is established.

Through the above processes, it is supposed that the preamble of about 100 symbols are received by the antenna 12 and passed therethrough.

These processes are completed by the time T2 when the frequency offset calculation is started.

The differential detection is started at the time T2 using the differential detector 17, and is continuously performed during the demodulation operation. Through this process, the frequency offset is obtained. Simultaneously, the operation of the PLL circuit 22 is started.

The phase distortion calculation of the first detector 17 is started at the time T3 and is finished at the time T4.

The operation of the PLL circuit 22 is finished at the time T5. The phase distortion calculation by means of the coherent, differential detector 26 is started at the time T5 and is finished at the time T6.

At the time T6, the phase distortion values by the coherent, differential detector 26 and the differential detector 17 are compared. Then, one of the detected outputs of the two detectors 17 and 26 having a relatively low phase distortion (i.e., relatively high data quality) is selectively outputted by the switch 30 to a phase discriminator 31.

Here, since the number of data modulation bits of each symbol is two (for QPSK), the four lower bits indicate a deviation from the theoretical value on the differential detection. In other words, the four lower bits indicate the data quality of phase.

Thus, a QPSK demodulated data is obtained.

Supposing that the lock-up time of the digital PLL circuit 22 is equivalent to the time period of 32 symbols, the receipt of the preamble 128 has been already finished at the time T5. The time T5 is defined as the time when the service bit SER is detected, because the lock-up of the second-order loop of the PLL circuit 22 can be deemed to be finished.

With the demodulator according to the embodiment of the invention, the phase distortion comparator 29 compares the phase distortions of the first and second detected signals and generates the result signal. The switch 30 serving as a detection mode selector selects one of the first and second detectors 17 and 26 according to the result signal.

Therefore, by selecting one of the first and second detectors 17 and 26 whose phase distortion is relatively low, an optimum demodulation operation can be performed in response to the environmental condition under which communications are made.

Also, even if the lock-up operation of the PLL circuit 22 is not completed and therefore, the compensated phase angle θ' is not obtained during the receipt of the preamble PR, a demodulation operation can be carried out by using the first detector 17. After the lock-up operation of the PLL circuit 22 is completed, a demodulation operation can be selectively performed by one of the first and second detectors 17 and 26 using the compensated phase angle θ and θ'.

As a result, a good demodulation operation can be performed independent of the preamble length.

Further, since no additional circuit such as an up-down counter, an edge detection circuit, or the like is required to the basic structure for the coherent detection, a good demodulation operation can be realized with a simple circuit structure.

While the preferred forms of the present invention have been described, it is to be understood that modifications will be apparent to those skilled in the art without departing from the spirit of the invention. The scope of the invention, therefore, is to be determined solely by the following claims.

What is claimed is:

1. A demodulator for demodulating a received input signal which has been subjected to phase modulation and which has been transmitted from a transmitting side, a frame format of said input signal including a preamble and data, said demodulator comprising:

a phase angle calculator for calculating a phase angle of said input signal;

a frequency offset calculator for calculating an offset of a carrier frequency of said input signal;

a PLL responsive to said calculated phase angle and said frequency offset for generating a compensated phase angle of said input signal, said compensated phase angle compensating said frequency offset;

a first detector for detecting said input signal using said calculated phase angle to generate a first detected signal;

second detector for detecting said input signal using said compensated phase angle to generate a second detected signal;

a first phase distortion calculator for calculating a phase distortion of said first detected signal;

a second phase distortion calculator for calculating a phase distortion of said second detected signal;

a phase distortion comparator for comparing said phase distortions of said first and second detected signals to generate a result signal; and a selector for selecting one of said first and second detected signals according to said result signal.

2. A demodulator as claimed in claim 1, wherein said selector selects one of said first and second detected signals whose phase distortion is relatively low.

3. A demodulator as claimed in claim 1, wherein said selector selects the first detected signal before the lock-up operation of said PLL is completed;

and wherein said selector selects one of said first and second detected signals whose phase distortion is relatively low after the lock-up operation of said PLL is completed.

4. A demodulator as claimed in claim 1, wherein said input signal contains quadrature components;

and wherein said quadrature components are A/D-converted by A/D converters, respectively;

and wherein said phase angle calculator calculates a phase angle between said A/D converted components.

5. A demodulator as claimed in claim 1, wherein each of said first and second detectors performs differential detection with respect to the values of the phase angle at adjacent two symbol timings.

6. A demodulator for demodulating a received input signal which has been subjected to phase modulation and which has been transmitted from a transmitting side, a frame format of said input signal including a preamble and data, said demodulator comprising:

(a) A/D converters for A/D converting respective quadrature components of said input signal to generate digital output signals, respectively;

(b) an angle calculator for calculating a phase angle between said digital output signals of said A/D converters;
said angle calculator generating a first output signal indicating said phase angle;

(c) a first differential detector for differentially detecting said first output signal of said angle calculator;

(d) a frequency offset calculator for calculating an offset of a carrier frequency of said input signal, said frequency offset calculator generating a second output signal indicating said frequency offset of said input signal;

(e) a digital PLL for generating a compensated phase angle between said quadrature components from said first and second output signal, said compensated phase angle compensating said frequency offset;

(f) a second differential detector for differentially detecting said compensated phase angle of said digital PLL; and (g) a selector for selecting an output from one of said first and second differential detectors;
wherein said selector selects an output from said first detector until a lock-up time of said digital PLL is passed;
and wherein said selector selects an output from one of said first and second detectors whose phase distortion is relatively low after said lock-up time of said digital PLL has been passed.

7. A demodulator as claimed in claim 6, wherein each of said first and second differential detectors performs differential detection with respect to the values of the phase angle at adjacent two symbol timings.

* * * * *